US012784635B2

(12) United States Patent
Pyun et al.

(10) Patent No.: US 12,784,635 B2
(45) Date of Patent: Nov. 3, 2026

(54) DISPLAY DEVICE AND METHOD FOR DRIVING THE SAME

(71) Applicant: Samsung Display Co., LTD., Yongin-si (KR)

(72) Inventors: Kihyun Pyun, Yongin-si (KR); Sung-Mo Yang, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/422,952

(22) Filed: Jan. 25, 2024

(65) Prior Publication Data

US 2025/0191514 A1 Jun. 12, 2025

(30) Foreign Application Priority Data

Mar. 20, 2023 (KR) ........................ 10-2023-0035849

(51) Int. Cl.
*G09G 3/20* (2006.01)

(52) U.S. Cl.
CPC ... *G09G 3/2092* (2013.01); *G09G 2320/0626* (2013.01); *G09G 2330/025* (2013.01); *G09G 2330/028* (2013.01); *G09G 2330/04* (2013.01)

(58) Field of Classification Search
None
See application file for complete search history.

(56) References Cited

U.S. PATENT DOCUMENTS

| | | | | |
|---|---|---|---|---|
| 2010/0013867 | A1* | 1/2010 | Kim | G09G 3/3233 313/504 |
| 2014/0104258 | A1* | 4/2014 | Oh | G09G 3/3233 345/76 |
| 2014/0340437 | A1* | 11/2014 | Kohashikawa | G09G 3/3426 345/694 |
| 2020/0143751 | A1* | 5/2020 | Byun | G09G 3/3291 |
| 2020/0279528 | A1* | 9/2020 | Kato | H04N 25/705 |

FOREIGN PATENT DOCUMENTS

| | | | |
|---|---|---|---|
| KR | 100394006 | B1 | 8/2003 |
| KR | 100888558 | B1 | 3/2009 |
| KR | 101177907 | B1 | 8/2012 |
| KR | 1020220122886 | A | 9/2022 |
| KR | 1020230129122 | A | 9/2023 |

* cited by examiner

*Primary Examiner* — Andre L Matthews
(74) *Attorney, Agent, or Firm* — CANTOR COLBURN LLP

(57) ABSTRACT

A display device includes a display panel including pixels, a power voltage generator which provides a power voltage to the display panel, a power current sensor which senses a power current of the display panel and generates a power current code by performing analog-to-digital conversion on the sensed power current, and a timing controller which determines an analog-to-digital conversion time of the power current based on a peak white luminance.

21 Claims, 13 Drawing Sheets

DISPLAY DEVICE AND METHOD FOR DRIVING THE SAME

This application claims priority to Korean Patent Application No. 10-2023-0035849, filed on Mar. 20, 2023, and all the benefits accruing therefrom under 35 U.S.C. § 119, the content of which in its entirety is herein incorporated by reference.

BACKGROUND

1. Field

Embodiments of the disclosure relate to a display device and a method for driving the display device. More particularly, embodiments of the disclosure relate to a display device capable of sensing a power current of a display panel and a method for driving the display device.

2. Description of the Related Art

In general, a display device may include a display panel, a gate driver, a data driver, and a timing controller. The display panel may include a plurality of gate lines, a plurality of data lines, and a plurality of pixels electrically connected to the gate lines and the data lines. The gate driver may provide gate signals to the gate lines, the data driver may provide data voltages to the data lines, and the timing controller may control the gate driver and the data driver.

SUMMARY

When a luminance of the display panel is not adjusted based on a load of input image data, an over current may flow through the data driver and/or the display panel, so that the data driver and/or the display panel may be damaged. Accordingly, the luminance of the display panel may be adjusted by sensing a power current of the display panel to prevent the damage to the data driver and/or the display panel due to such an over current.

When the power current of the display panel is sensed, the sensed power current may be subjected to analog-to-digital conversion and transmitted to the timing controller. In this case, when an analog-to-digital conversion time is long, a response speed for an over current may become slow, so that power consumption caused by the over current may be increased. Conversely, when the analog-to-digital conversion time is short, a noise caused by a ripple of the power current may be increased, so that accuracy of the analog-to-digital conversion may be decreased.

Embodiments of the disclosure provide a display device capable of adjusting an analog-to-digital conversion time in consideration of power consumption caused by an over current.

Embodiments of the disclosure provide a display device capable of adjusting a current limit in consideration of power consumption caused by an over current.

Embodiments of the disclosure provide a method for driving a display device, capable of driving the display device.

However, the embodiments of the disclosure are not limited thereto. Thus, the embodiments of the disclosure may be extended without departing from the spirit and the scope of the disclosure.

According to embodiments, a display device includes a display panel including pixels, a power voltage generator which provides a power voltage to the display panel, a power current sensor which senses a power current of the display panel and generates a power current code by performing analog-to-digital conversion on the sensed power current, and a timing controller which determines an analog-to-digital conversion time of the power current based on a peak white luminance.

In an embodiment, the peak white luminance may be a maximum luminance of the display panel.

In an embodiment, the analog-to-digital conversion time may be gradually decreased as the peak white luminance increases.

In an embodiment, the timing controller may be configured to determine the peak white luminance based on a preset peak setting value and a preset gain setting value.

In an embodiment, the peak white luminance may be gradually decreased as the peak setting value decreases.

In an embodiment, the peak white luminance may be gradually decreased as the gain setting value decreases.

In an embodiment, the timing controller may be configured to determine the analog-to-digital conversion time by using a conversion time lookup table including the analog-to-digital conversion time according to the peak white luminance.

In an embodiment, the timing controller may be configured to decrease the power voltage when a current value corresponding to the power current code exceeds a current limit.

In an embodiment, the timing controller may be configured to determine the current limit based on a full white luminance.

In an embodiment, the full white luminance may be a luminance when the display panel displays a full white image.

In an embodiment, the current limit may be gradually decreased as the full white luminance decreases.

In an embodiment, the timing controller may be configured to determine the full white luminance based on a preset gain setting value.

In an embodiment, the full white luminance may be gradually decreased as the gain setting value decreases.

In an embodiment, the timing controller may be configured to determine the current limit by using a current limit lookup table including the current limit according to the full white luminance.

According to embodiments, a display device includes a display panel including pixels, a power voltage generator which provides a power voltage to the display panel, a power current sensor which senses a power current of the display panel and to generate a power current code by performing analog-to-digital conversion on the sensed power current, and a timing controller which decreases the power voltage when a current value corresponding to the power current code exceeds a current limit and to determine the current limit based on a full white luminance.

In an embodiment, the current limit may be gradually decreased as the full white luminance decreases.

In an embodiment, the timing controller may be configured to determine the full white luminance based on a preset gain setting value.

In an embodiment, the timing controller may be configured to determine the current limit by using a current limit lookup table including the current limit according to the full white luminance.

According to embodiments, a method for driving a display device includes determining an analog-to-digital conversion time of a power current of a display panel based on a peak white luminance, sensing the power current of the display panel, and generating a power current code by performing analog-to-digital conversion on the sensed power current.

In an embodiment, the method may further include determining a current limit based on a full white luminance and decreasing a power voltage of the display panel when a current value corresponding to the power current code exceeds the current limit.

Therefore, a display device according to embodiments may adjust an analog-to-digital conversion time based on a peak white luminance, so that an increase in power consumption caused by an over current can be minimized, and accuracy of analog-to-digital conversion can be improved.

In addition, a display device according to embodiments may adjust a current limit based on a full white luminance, so that power consumption caused by an over current can be decreased.

However, the effect of the disclosure is not limited thereto. Thus, the effect of the disclosure may be extended without departing from the spirit and the scope of the disclosure.

DETAILED DESCRIPTION

Figure 1:
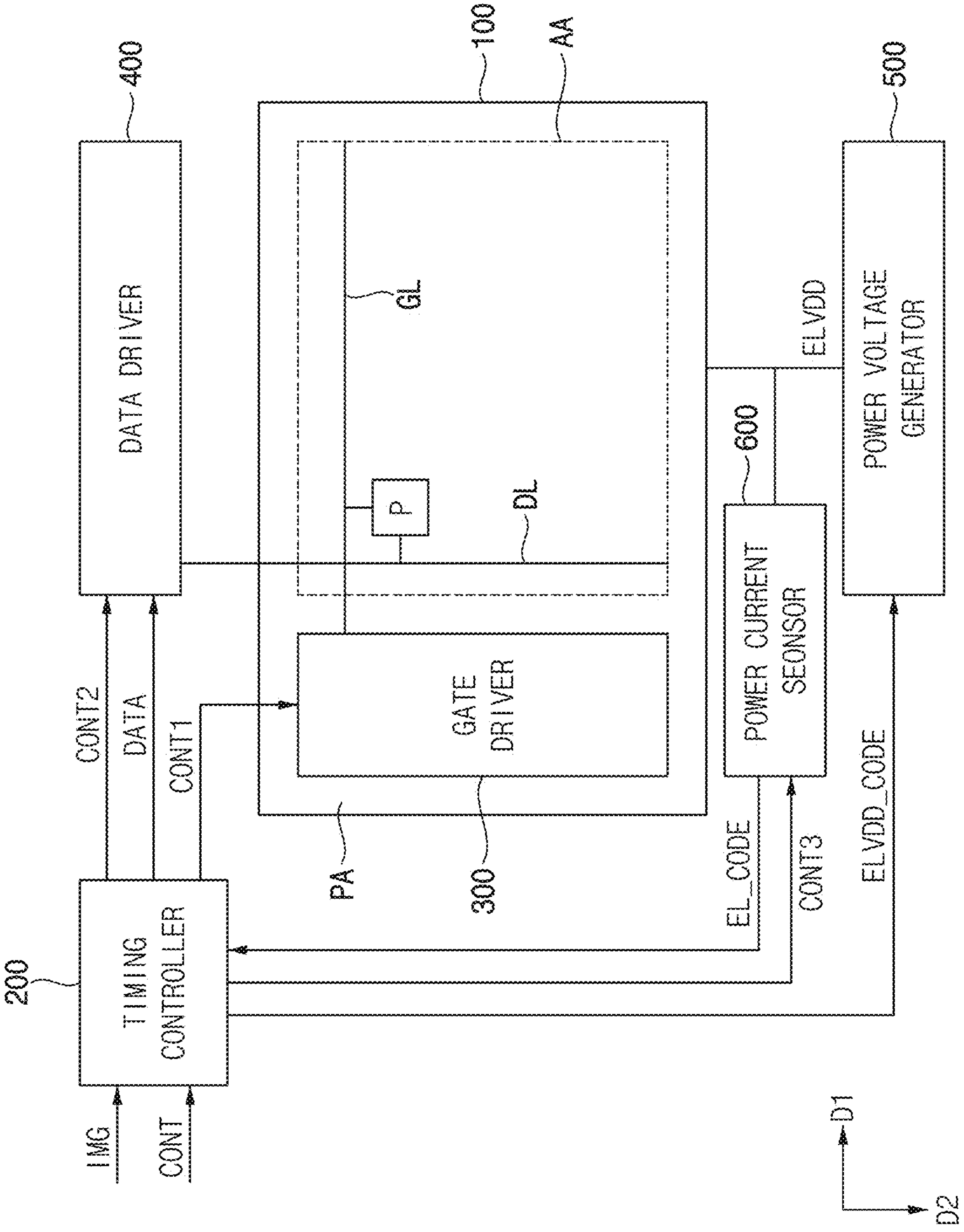
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

FIG. 1 is a block diagram illustrating a display device according to embodiments.

Referring to FIG. 1, an embodiment of a display device may include a display panel 100, a timing controller 200, a gate driver 300, a data driver 400, a power voltage generator 500, and a power current sensor 600. In an embodiment, the timing controller 200 and the data driver 400 may be integrated on a single chip.

The display panel 100 may include a display part AA in which an image is displayed, and a peripheral part PA that is adjacent to the display part AA. In an embodiment, the gate driver 300 may be mounted in the peripheral part PA.

The display panel 100 may include a plurality of gate lines GL, a plurality of data lines DL, and a plurality of pixels P electrically connected to the gate lines GL and the data lines DL. The gate lines GL may extend in a first direction D1, and the data lines DL may extend in a second direction D2 intersecting the first direction D1.

The timing controller 200 may receive input image data IMG and an input control signal CONT from a main processor (e.g., a graphic processing unit (GPU), etc.). in an embodiment, for example, the input image data IMG may include red image data, green image data, and blue image data. In an embodiment, the input image data IMG may further include white image data. In an embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The timing controller 200 may generate a first control signal CONT1, a second control signal CONT2, and a data signal DATA based on the input image data IMG and the input control signal CONT.

The timing controller 200 may generate the first control signal CONT1 for controlling an operation of the gate driver 300 based on the input control signal CONT to output the generated first control signal CONT1 to the gate driver 300. The first control signal CONT1 may include a vertical start signal and a gate clock signal.

The timing controller 200 may generate the second control signal CONT2 for controlling an operation of the data driver 400 based on the input control signal CONT to output the generated second control signal CONT2 to the data driver 400. The second control signal CONT2 may include a horizontal start signal and a load signal.

The timing controller 200 may receive the input image data IMG and the input control signal CONT to generate the data signal DATA. The timing controller 200 may output the data signal DATA to the data driver 400.

The gate driver 300 may generate gate signals for driving the gate lines GL in response to the first control signal CONT1 received from the timing controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the timing controller 200. The data driver 400 may generate data voltages obtained by converting the data signal DATA into an analog voltage. The data driver 400 may output the data voltages to the data lines DL.

The power voltage generator 500 may provide a power voltage ELVDD to the display panel 100. The power voltage ELVDD may be a voltage for driving the pixels P. The timing controller 200 may provide a power voltage code ELVDD_CODE to the power voltage generator 500. The power voltage generator 500 may perform digital-to-analog conversion on the power voltage code ELVDD_CODE. The power voltage generator 500 may generate the power voltage ELVDD having a voltage value corresponding to the power voltage code ELVDD_CODE.

The power current sensor 600 may sense a power current of the display panel 100. The power current may be a current flowing through a line, to which the power voltage ELVDD is applied. The power current sensor 600 may generate a power current code EL_CODE by performing analog-to-digital conversion on the sensed power current. The timing controller 200 may provide a third control signal CONT3 for controlling an analog-to-digital conversion time to the power current sensor 600. The power current sensor 600 may perform the analog-to-digital conversion on the power current at the analog-to-digital conversion time corresponding to the third control signal CONT3.

Figure 2:
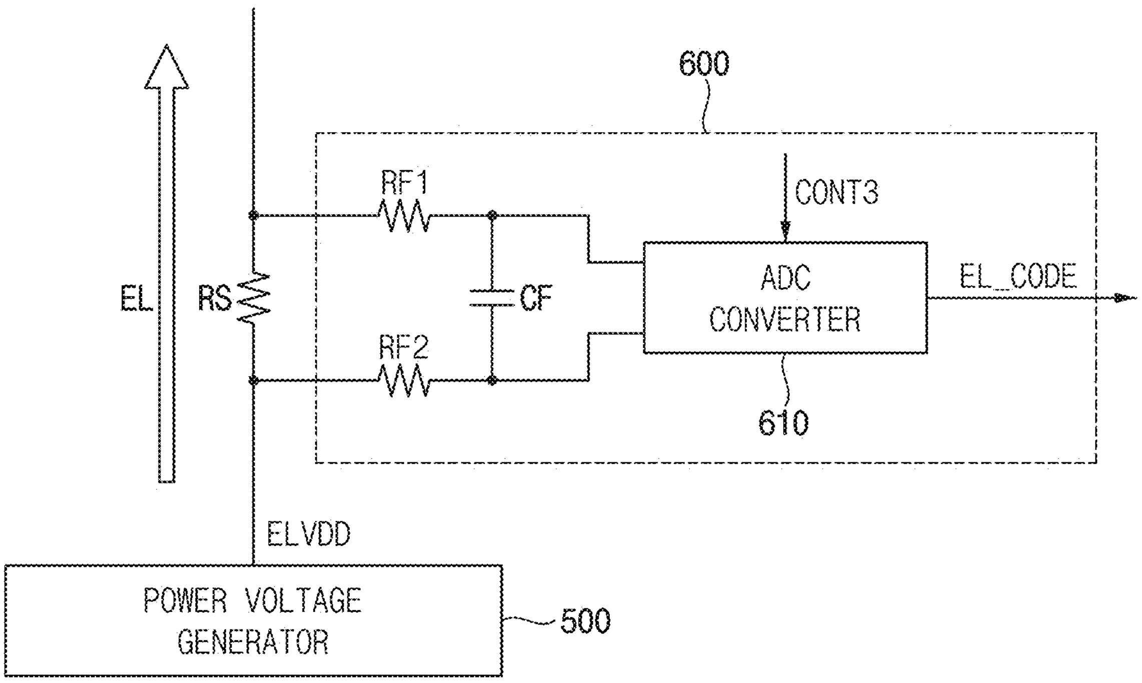
FIG. 2 is a diagram illustrating an embodiment of a power current sensor in FIG. 1.

FIG. 2 is a diagram illustrating an embodiment of a power current sensor 600 in FIG. 1.

Referring to FIGS. 1 and 2, an embodiment of the power current sensor 600 may sense the power current EL of the display panel 100, and generate the power current code EL_CODE by performing the analog-to-digital conversion on the sensed power current EL.

The power current sensor 600 may include an analog-to-digital converter 610 configured to generate the power current code EL_CODE by performing the analog-to-digital conversion on the sensed power current EL. In an embodiment, for example, the analog-to-digital converter 610 may provide the power current code EL_CODE to the timing controller 200 through inter-integrated circuit (I2C) communication.

The analog-to-digital converter 610 may receive the third control signal CONT3 from the timing controller 200. The analog-to-digital converter 610 may perform the analog-to-digital conversion on the power current EL based on the analog-to-digital conversion time in response to the third control signal CONT3. The analog-to-digital conversion time may be a sampling interval for converting an analog signal to a digital signal.

In an embodiment, for example, the power current sensor 600 may sense a voltage across a sensing resistor RS included in the line, to which the power voltage ELVDD is applied. The power current sensor 600 may measure the power current EL through the voltage across the sensing resistor RS.

In an embodiment, the power current sensor 600 may include a first filter resistance element RF1, a second filter resistance element RF2, and a filter capacitor CF. In an embodiment, for example, the first filter resistance element RF1 may include a first end connected to a first end of the sensing resistor RS, and a second end connected to the analog-to-digital converter 610. In an embodiment, for example, the second filter resistance element RF2 may include a first end connected to a second end of the sensing resistor RS, and a second end connected to the analog-to-digital converter 610. In an embodiment, for example, the filter capacitor CF may include a first end connected to the second end of the first filter resistance element RF1, and a second end connected to the second end of the second filter resistance element RF2.

Figure 3:
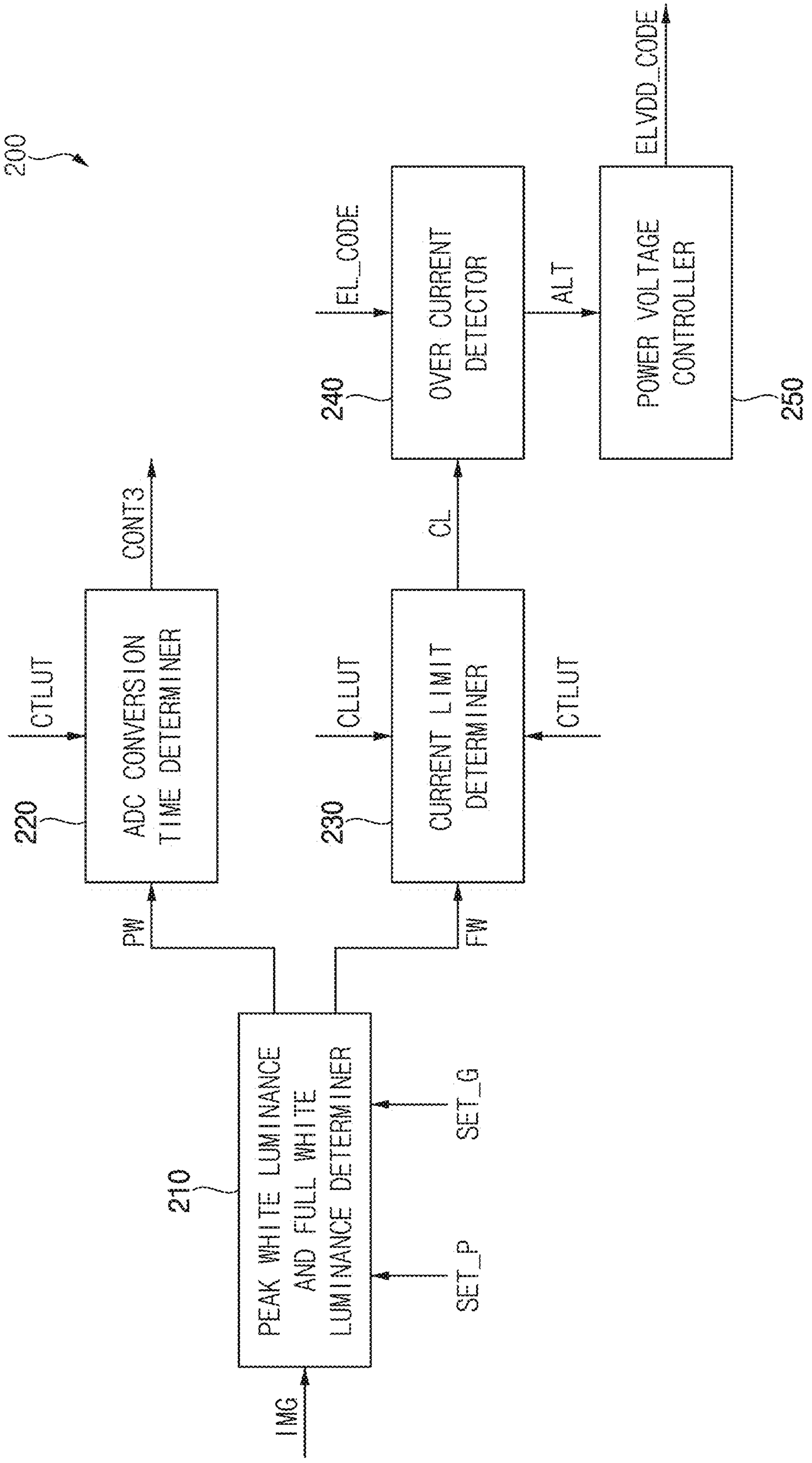
FIG. 3 is a block diagram illustrating an embodiment of a timing controller in FIG. 1.

FIG. 3 is a block diagram illustrating an embodiment of a timing controller 200 in FIG. 1.

Referring to FIGS. 1 to 3, an embodiment of the timing controller 200 may include a peak white luminance and full white luminance determiner 210, an analog-to-digital conversion time determiner 220, a current limit determiner 230, an over current detector 240, and a power voltage controller 250.

Hereinafter, the operation of the timing controller 200 will be described in detail with reference to FIGS. 4 to 14.

Figure 4:
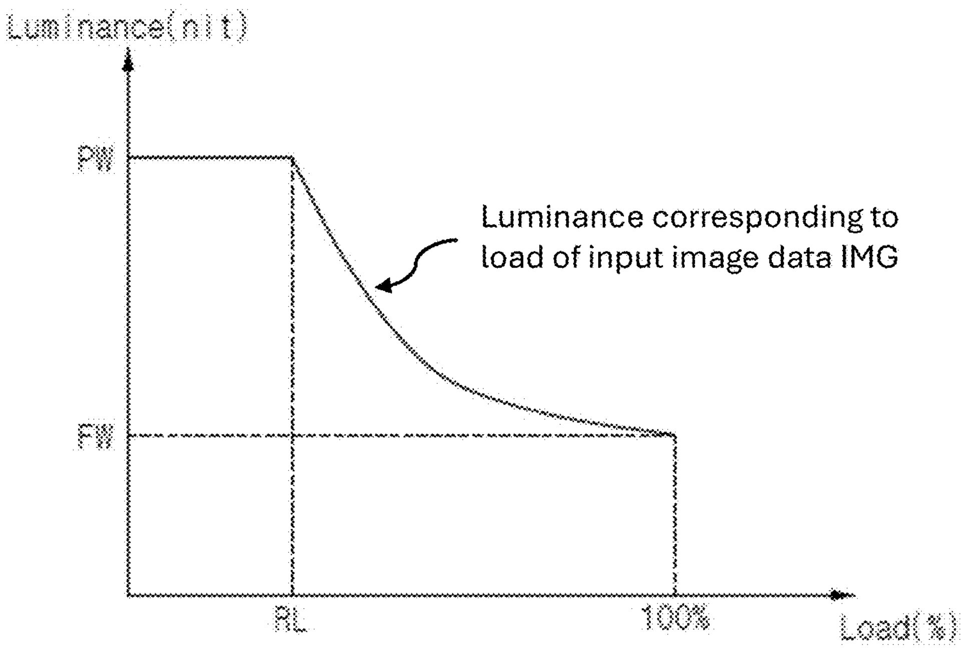
FIG. 4 is a graph illustrating an example of a luminance curve according to a load of input image data.
Figure 5:
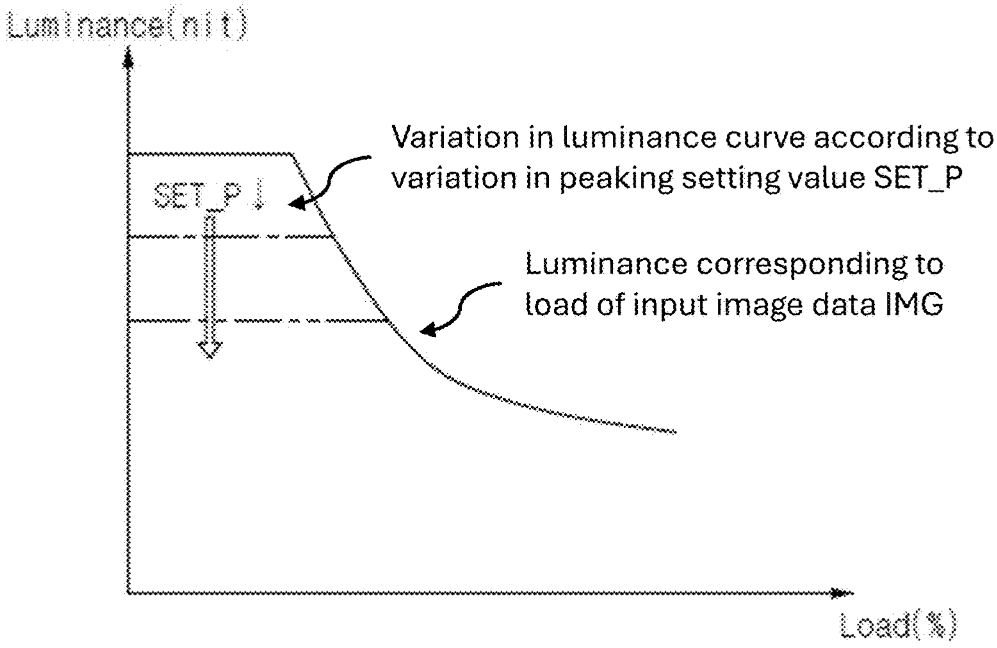
FIG. 5 is a graph illustrating an example of a variation in a luminance curve according to a peak setting value.
Figure 6:
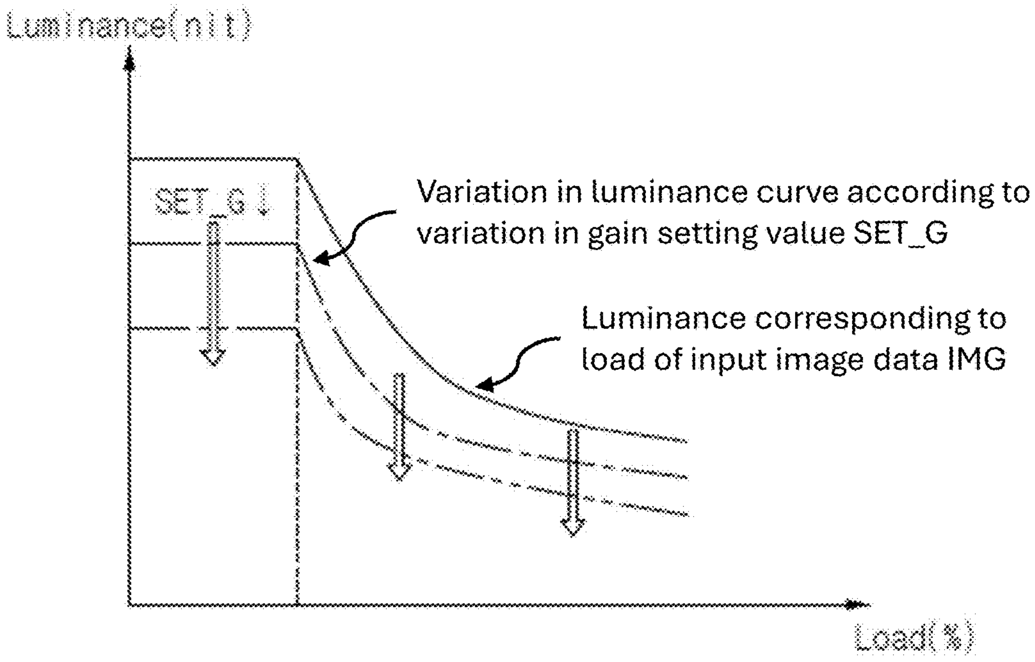
FIG. 6 is a graph illustrating an example of a variation in a luminance curve according to a gain setting value.

FIG. 4 is a graph illustrating an example of a luminance curve according to a load of input image data IMG, FIG. 5 is a graph illustrating an example of a variation in a luminance curve according to a peak setting value SET_P, and FIG. 6 is a graph illustrating an example of a variation in a luminance curve according to a gain setting value SET_G.

Referring to FIGS. 1, 3, and 4, in an embodiment, the timing controller 200 may determine a peak white luminance PW based on a preset peak setting value SET_P and a preset gain setting value SET_G. The timing controller 200 may determine a full white luminance FW based on the preset gain setting value SET_G.

In an embodiment, for example, the peak setting value SET_P and the gain setting value SET_G may be values set by a user. In addition, a luminance curve of FIG. 4 may be determined based on the peak setting value SET_P and the gain setting value SET_G. The timing controller 200 may adjust a luminance of a displayed image based on the luminance curve.

The luminance curve may represent a luminance corresponding to a load of the input image data IMG. The load of the input image data IMG may have a value from 0% to 100%. In an embodiment, the load of the input image data IMG may be determined based on a sum of gray levels of the input image data IMG. In an embodiment, for example, the load of the input image data IMG for a full white image may be 100%. In an embodiment, for example, the load of the input image data IMG for a full black image may be 0%.

In an embodiment, a luminance of the luminance curve may have the peak white luminance PW between a minimum load (i.e., 0%) and a reference load RL. The luminance of the luminance curve may be decreased from the peak white luminance PW to the full white luminance FW between the reference load RL and a maximum load (i.e., 100%).

In an embodiment, the luminance of the luminance curve may represent a luminance of a maximum gray level (i.e., a white gray level) at a corresponding load. For example, in a case where the luminance of the luminance curve is the peak white luminance PW when the input image data IMG displays the maximum gray level (i.e., the white gray level) in a 10% region of the display part AA and displays the minimum gray level (i.e., the black gray level) in the remaining 90% region of the display part AA, and the load is 10%, the load of the input image data IMG may be 10%, and a luminance of the region in which the maximum gray level is displayed may be the peak white luminance PW.

The peak white luminance PW may be a maximum luminance of the display panel 100, that is, a maximum luminance displayed or displayable by the display panel 100. In addition, the full white luminance FW may be a luminance when the display panel 100 displays the full white image.

Referring to FIGS. 4 and 5, the peak setting value SET_P may adjust the peak white luminance PW. In an embodiment, the peak white luminance PW may be gradually decreased as the peak setting value SET_P decreases.

The peak setting value SET_P may only adjust the peak white luminance PW without influencing the full white luminance FW. Therefore, even when the peak setting value SET_P is changed, the full white luminance FW may be constant.

Referring to FIGS. 4 and 6, the gain setting value SET_G may adjust the peak white luminance PW and the full white luminance FW. In an embodiment, the peak white luminance PW may be gradually decreased as the gain setting value SET_G decreases. In an embodiment, the full white luminance FW may be gradually decreased as the gain setting value SET_G decreases.

Unlike the peak setting value SET_P, the gain setting value SET_G may lower an overall luminance curve. Therefore, both the peak white luminance PW and the full white luminance FW may be changed based on the gain setting value SET_G.

Figure 7:
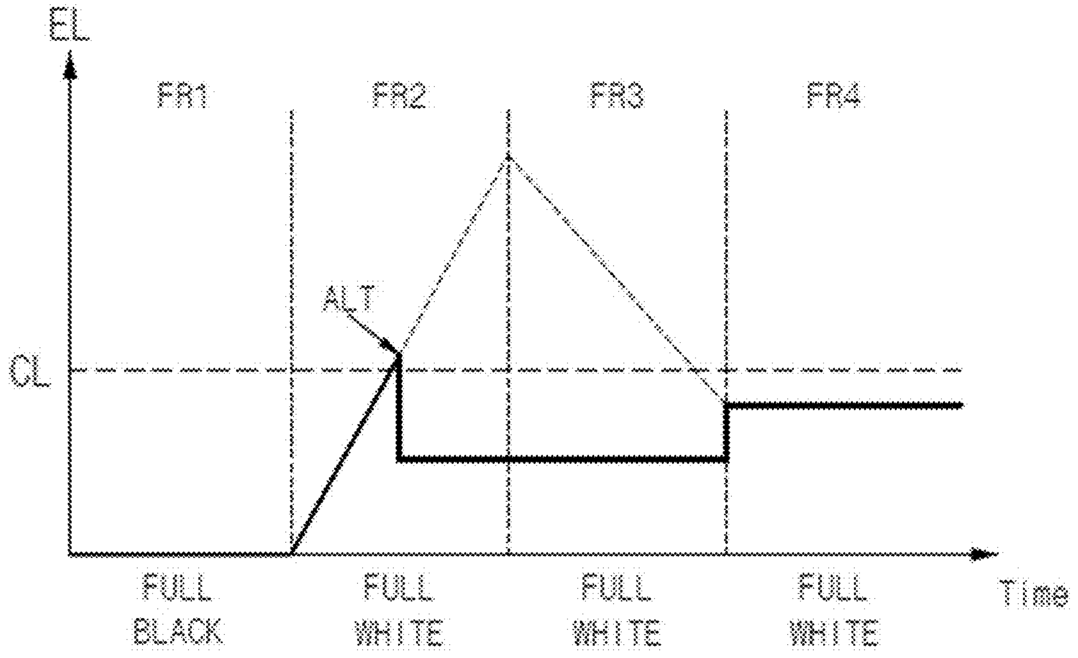
FIG. 7 is a graph illustrating an example in which the display device of FIG. 1 adjusts a power current.

FIG. 7 is a graph illustrating an example in which the display device of FIG. 1 adjusts a power current EL.

Referring to FIGS. 1 to 3 and 7, in an embodiment, the timing controller 200 may decrease the power voltage ELVDD when a current value corresponding to the power current code EL_CODE exceeds a current limit CL.

The over current detector 240 may receive the power current code EL_CODE and the current limit CL. The over current detector 240 may provide an alarm signal ALT having an activation level to the power voltage controller 250 when the current value corresponding to the power current code EL_CODE exceeds the current limit CL.

When the power voltage controller 250 receives the alarm signal ALT having the activation level, the power voltage controller 250 may provide a power voltage code ELVDD_CODE corresponding to a voltage value that is lower than the existing or normal power voltage ELVDD to the power voltage generator 500. Accordingly, the power voltage generator 500 may generate a power voltage ELVDD having the voltage value corresponding to the power voltage code ELVDD_CODE. Accordingly, the power voltage ELVDD may be decreased when the power current EL exceeds the current limit CL.

In an embodiment, for example, as shown in FIG. 7, when the full black image is displayed in a first frame FR1, and the full white image is displayed in a second frame FR2, an over current may flow in the second frame FR2 due to an inrush current. The over current detector 240 may detect an over current, which is defined as the power current EL exceeding the current limit CL, and the power voltage controller 250 may decrease the power voltage ELVDD when the over current is detected, so that the power current EL may be decreased.

In an embodiment, the decreased power voltage ELVDD may be maintained for a predetermined frame, and restored to the existing or normal power voltage ELVDD. In an embodiment, for example, as shown in FIG. 7, the decreased power voltage ELVDD may be maintained until a third frame FR3, and restored to the existing or normal power voltage ELVDD in a fourth frame FR4.

In an embodiment, the decreased power voltage ELVDD may be restored to the existing or normal power voltage ELVDD in a next frame after the power current EL becomes less than or equal to the current limit CL.

Figure 8:
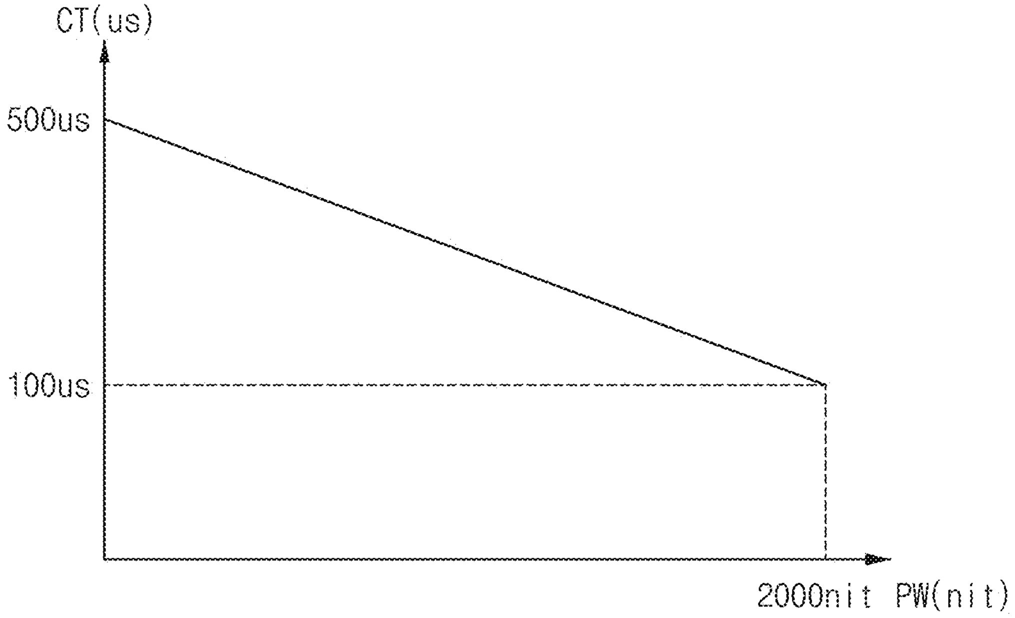
FIG. 8 is a graph illustrating an example in which the display device of FIG. 1 adjusts an analog-to-digital conversion time according to a peak white luminance.
Figure 9:
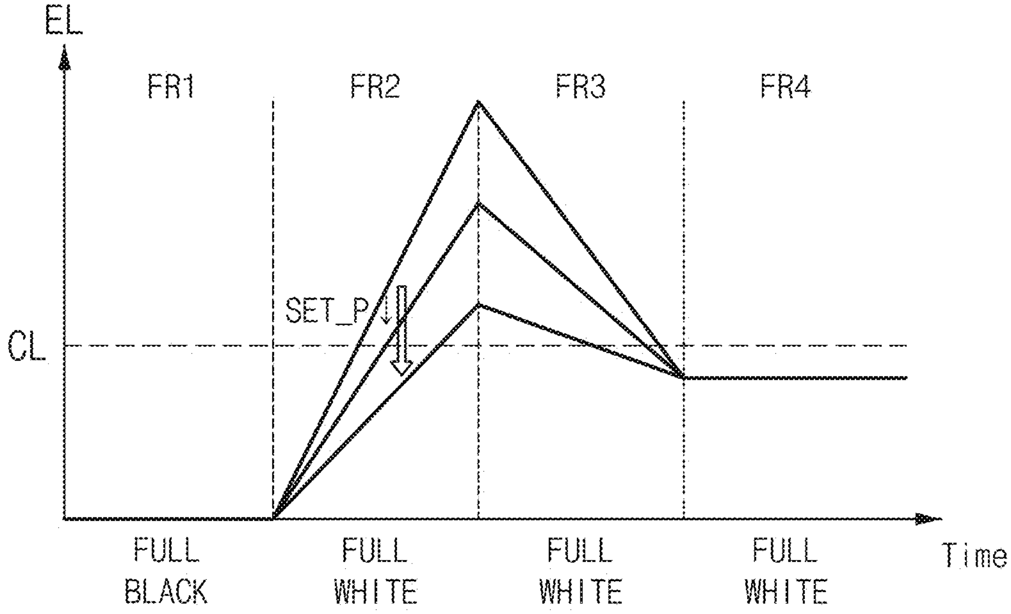
FIG. 9 is a graph illustrating an example of a power current according to a peak setting value when the power current is not adjusted.
Figure 10:
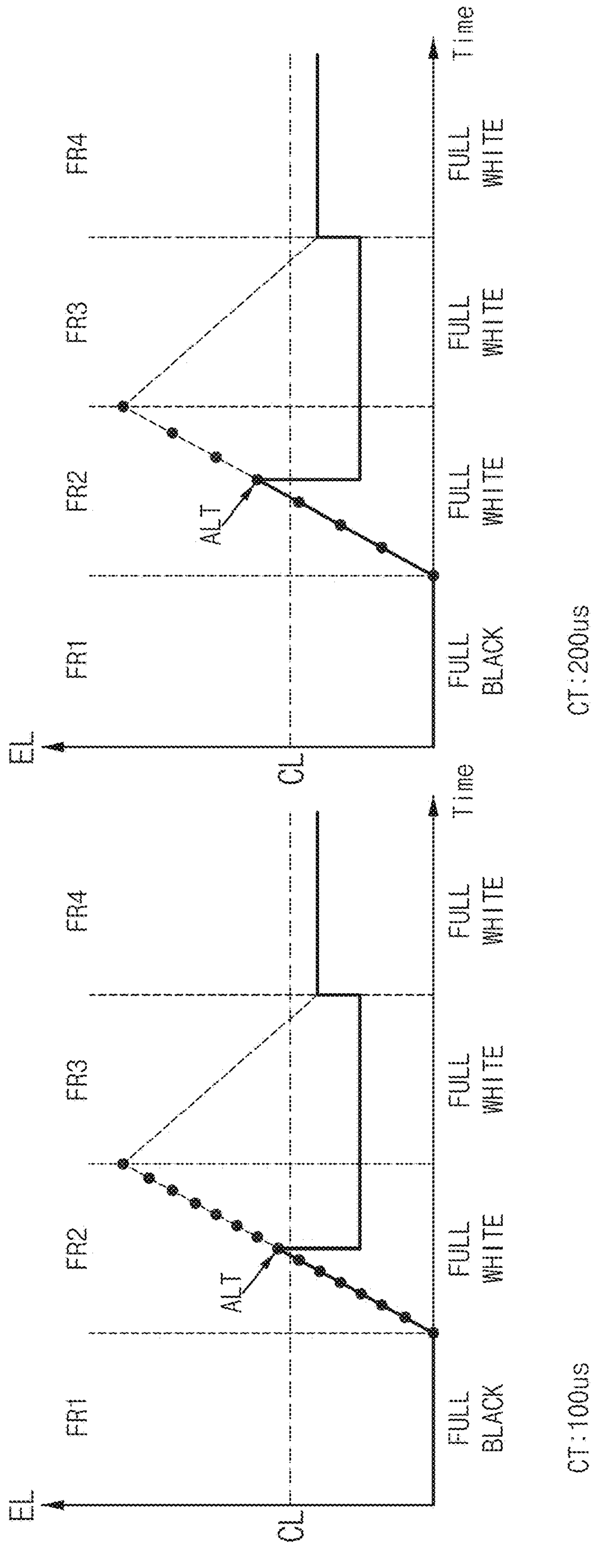
FIG. 10 is a graph illustrating an example of a power current when a peak white luminance is 2000 nits.
Figure 11:
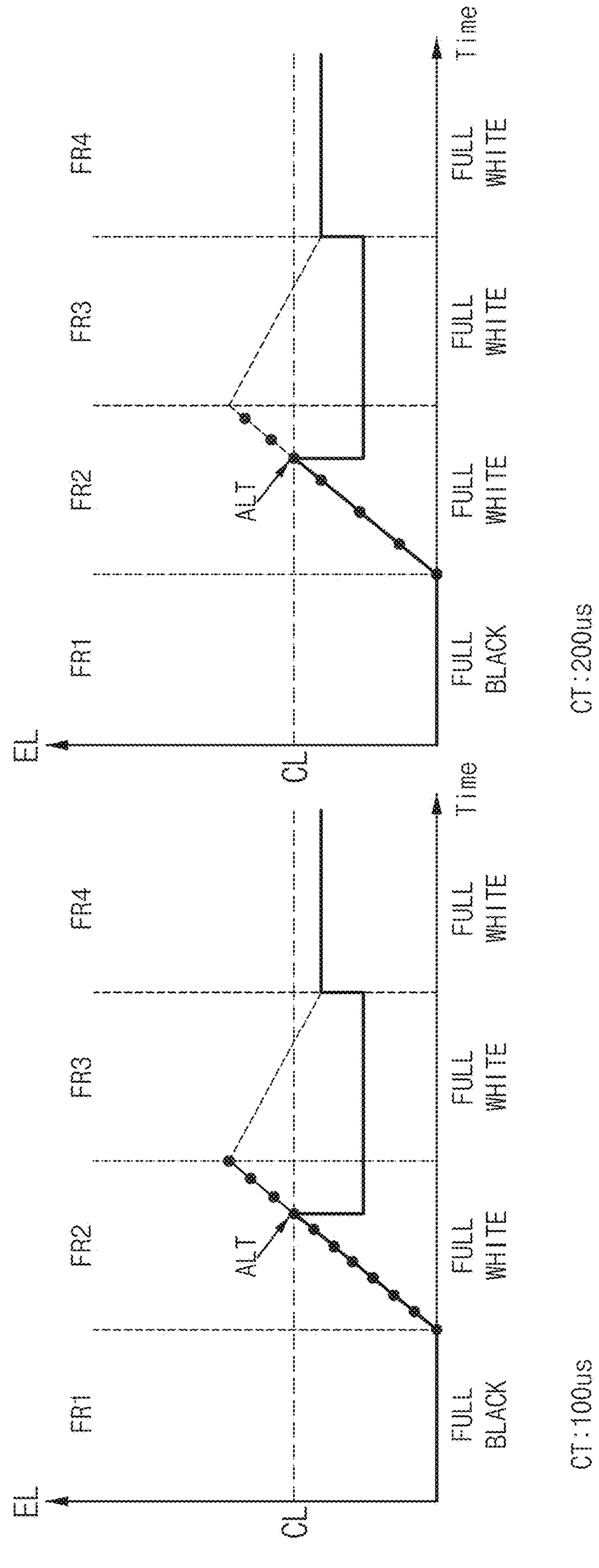
FIG. 11 is a graph illustrating an example of a power current when a peak white luminance is 1000 nits.

FIG. 8 is a graph illustrating an example in which the display device of FIG. 1 adjusts an analog-to-digital conversion time CT according to a peak white luminance PW, FIG. 9 is a graph illustrating an example of a power current EL according to a peak setting value SET_P when the power current EL is not adjusted, FIG. 10 is a graph illustrating an example of a power current EL when a peak white luminance PW is 2000 nits, and FIG. 11 is a graph illustrating an example of a power current EL when a peak white luminance PW is 1000 nits.

Dots shown in FIGS. 10 and 11 may represent a timing at which the over current detector 240 receives the power current code EL_CODE. In other words, an interval between the dots may correspond to the analog-to-digital conversion time CT. In addition, FIGS. 10 and 11 show graphs in which the analog-to-digital conversion time CT is fixed for comparison.

Referring to FIGS. 3 and 8, the timing controller 200 may determine the analog-to-digital conversion time CT of the power current EL based on the peak white luminance PW. The analog-to-digital conversion time CT may be gradually decreased as the peak white luminance PW increases. In an embodiment, for example, the analog-to-digital conversion time CT may be gradually decreased from 500 microseconds (us) to 100 us as the peak white luminance PW increases to 2000 nits or candela per square meter (cd/$m^2$).

In an embodiment, the timing controller 200 may determine the analog-to-digital conversion time CT by using a conversion time lookup table CTLUT including the analog-to-digital conversion time CT corresponding to the peak white luminance PW.

Referring to FIGS. 3 and 9, when the peak setting value SET_P is decreased, the peak white luminance PW may be decreased. In addition, as shown in FIG. 9, when the peak white luminance PW is decreased, the inrush current may be decreased. Further, an upward inclination of the power current EL caused by the inrush current may be decreased.

Referring to FIGS. 3, 8, 10, and 11, when the analog-to-digital conversion time CT is increased, a response speed for the over current may become slow, so that power consumption caused by the over current may be increased. However, since the upward inclination of the power current EL caused by the inrush current is decreased as the peak white luminance PW decreases, an increase in the power consumption caused by the over current, which results from the increase in the analog-to-digital conversion time CT, may become smaller as the peak white luminance PW decreases.

For example, with reference to FIGS. 10 and 11, when the analog-to-digital conversion time CT is increased from 100 us to 200 us, an increase in a time during which the over current flows shown in FIG. 10 may be greater than that shown in FIG. 11. In other words, the increase in the power consumption caused by the over current, which results from the increase in the analog-to-digital conversion time CT, shown in FIG. 10 may be greater than that shown in FIG. 11.

In addition, a noise caused by a ripple of the power current EL may be decreased as the analog-to-digital conversion time CT increases, so that accuracy of the analog-to-digital conversion may be increased.

Therefore, in an embodiment, the display device may gradually increase the analog-to-digital conversion time CT as the peak white luminance PW decreases, so that the increase in the power consumption caused by the over current may be minimized, and the accuracy of the analog-to-digital conversion may be improved.

In an embodiment, as described above, the analog-to-digital conversion time CT may be determined based on the peak white luminance PW. In an embodiment, the analog-to-digital conversion time CT may be determined based on the full white luminance FW, a driving frequency of the display panel, or the like.

Figure 12:
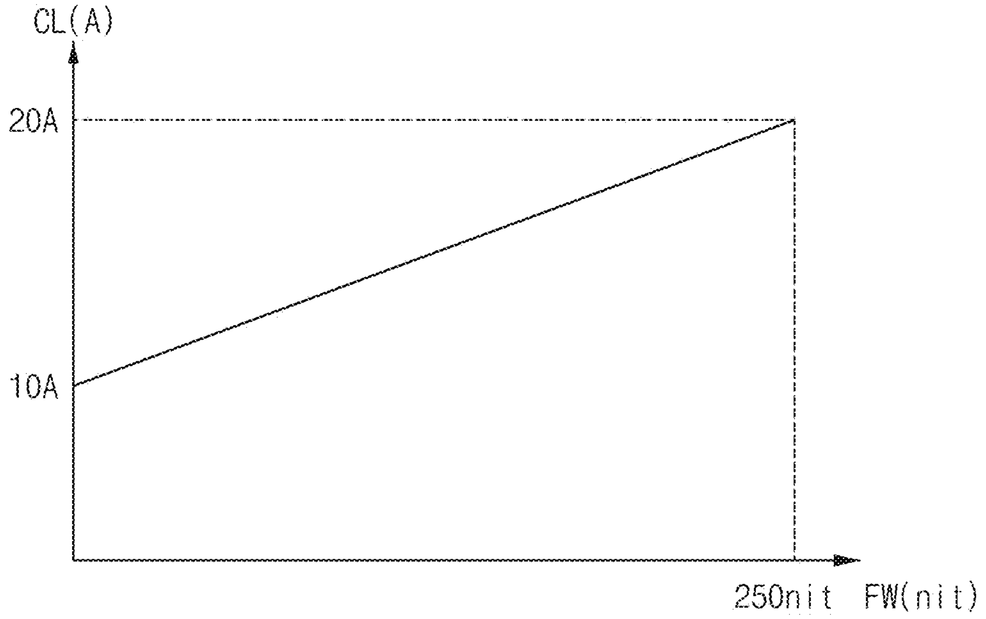
FIG. 12 is a graph illustrating an example in which the display device of FIG. 1 adjusts a current limit according to a full white luminance.
Figure 13:
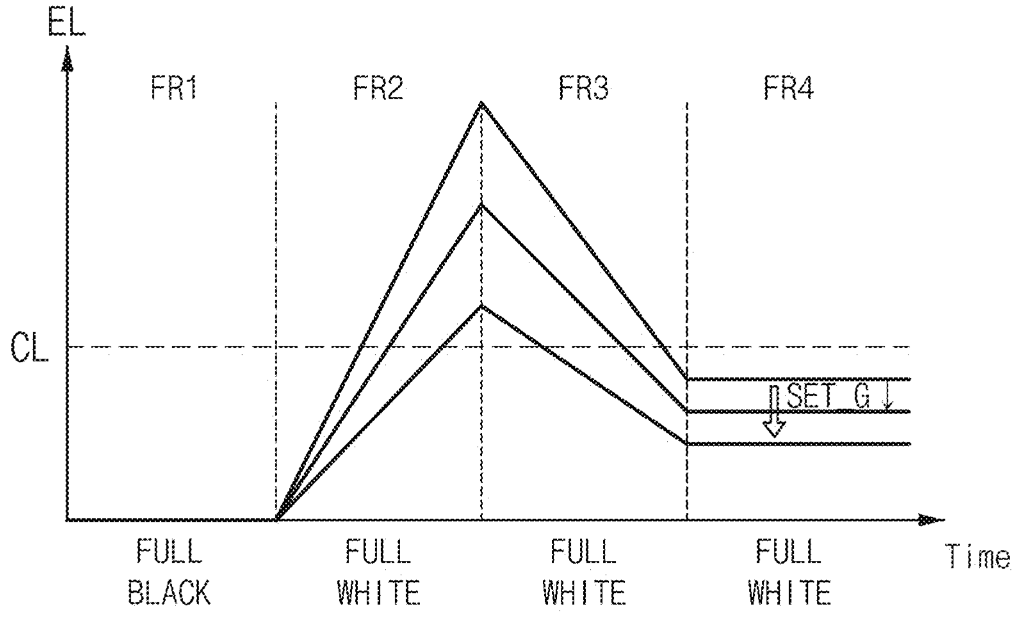
FIG. 13 is a graph illustrating an example of a power current according to a gain setting value when the power current is not adjusted.
Figure 14:
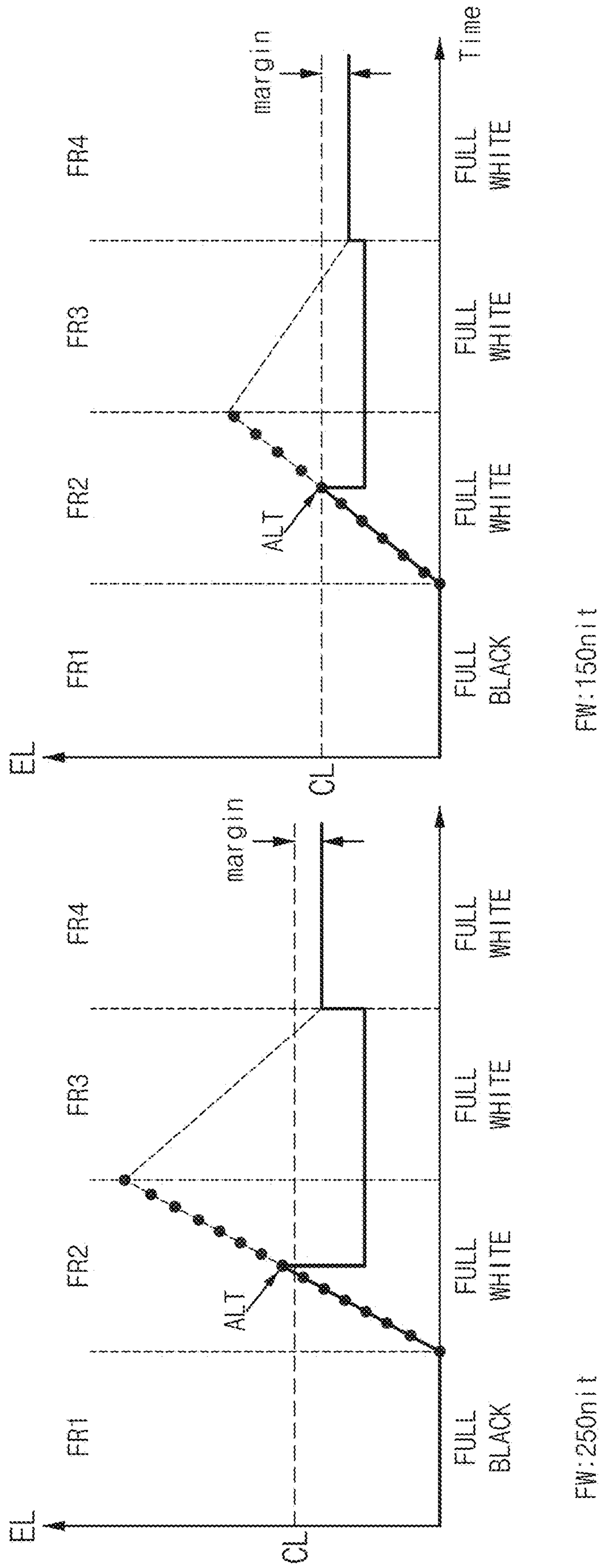
FIG. 14 is a graph illustrating an example of a power current when a full white luminance is 250 nits or 150 nits.

FIG. 12 is a graph illustrating an example in which the display device of FIG. 1 adjusts a current limit CL according to a full white luminance FW, FIG. 13 is a graph illustrating an example of a power current EL according to a gain setting value SET_G when the power current EL is not adjusted, and FIG. 14 is a graph illustrating an example of a power current EL when a full white luminance FW is 250 nits or 150 nits.

Dots shown in FIG. 14 may represent a timing at which the over current detector 240 receives the power current code EL_CODE. In other words, an interval between the dots may correspond to the analog-to-digital conversion time CT.

Referring to FIGS. 3 and 12, in an embodiment, the timing controller 200 may determine the current limit CL based on the full white luminance FW. The current limit CL may be gradually decreased as the full white luminance FW decreases. In an embodiment, for example, the current limit CL may be gradually increased from 10 ampere (A) to 20 A as the full white luminance FW increases to 250 nits.

In an embodiment, the timing controller 200 may determine the current limit CL by using a current limit lookup table CLLUT including the current limit CL corresponding to the full white luminance FW.

Referring to FIGS. 3 and 13, when the gain setting value SET_G is decreased, the peak white luminance PW and the full white luminance FW may be decreased. In addition, as shown in FIG. 13, when the full white luminance FW is decreased, a margin between the current limit CL and the power current EL at the full white luminance FW (i.e., the power current EL in the fourth frame FR4) may be increased.

Referring to FIGS. 3, 12, and 14, when the full white luminance FW is decreased, the margin between the current limit CL and the power current EL at the full white luminance FW may be increased, so that the display device may further decrease the current limit CL.

For example, as shown in FIG. 14, in a case where the full white luminance FW is 150 nits, the margin may be similar even when the current limit CL is decreased as compared with a case where the full white luminance FW is 250 nits.

Therefore, the display device may gradually decrease the current limit as the full white luminance FW decreases, so that the power consumption caused by the over current may be decreased.

Figure 15:
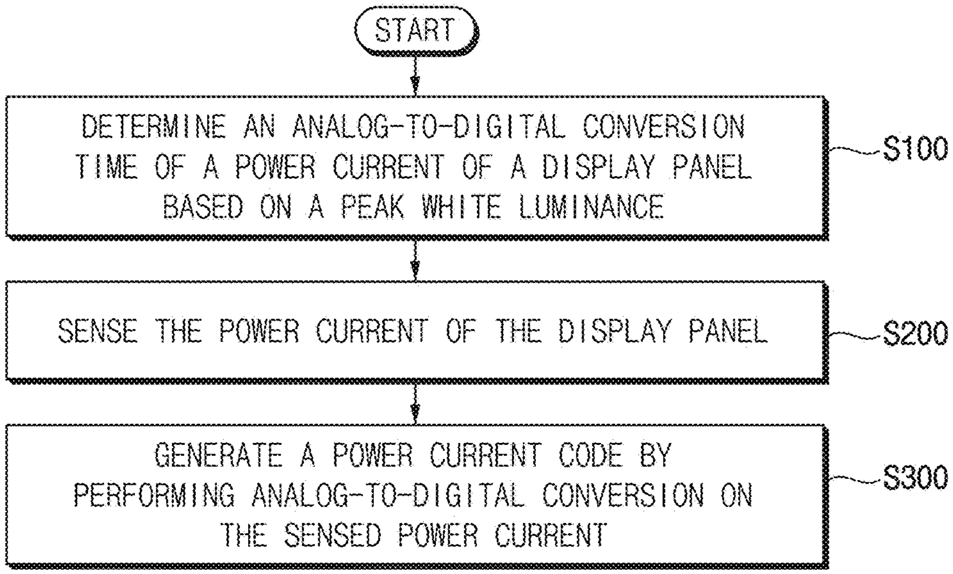
FIG. 15 is a flowchart illustrating a method for driving a display device according to embodiments.

FIG. 15 is a flowchart illustrating a method for driving a display device according to embodiments.

Referring to FIG. 15, an embodiment of a method for driving a display device may include determining an analog-to-digital conversion time of a power current of a display panel based on a peak white luminance (S100), sensing the power current of the display panel (S200), and generating a power current code by performing analog-to-digital conversion on the sensed power current (S300).

In an embodiment, as shown in FIG. 15, the method for driving the display device may include determining the analog-to-digital conversion time of the power current of the display panel based on the peak white luminance (S100). In an embodiment, the analog-to-digital conversion time may be gradually increased as the peak white luminance decreases. In an embodiment, the analog-to-digital conversion time may be determined by using a conversion time lookup table including the analog-to-digital conversion time corresponding to the peak white luminance.

Figure 16:
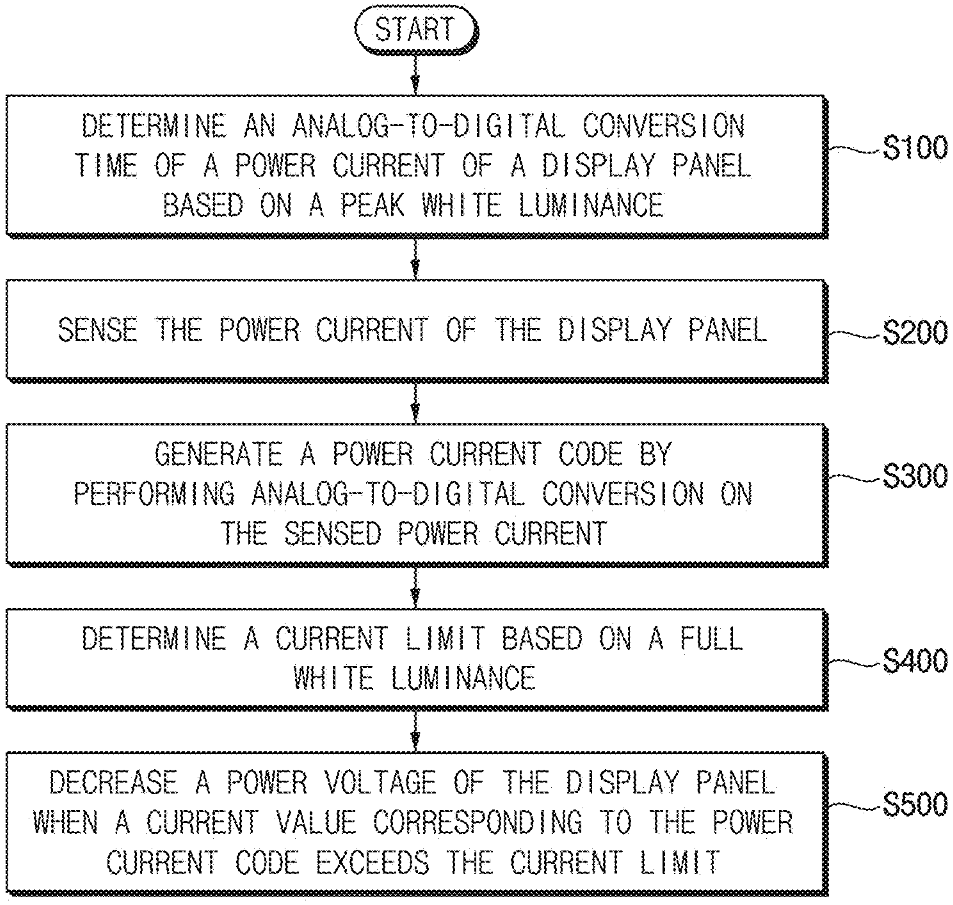
FIG. 16 is a flowchart illustrating a method for driving a display device according to embodiments.

FIG. 16 is a flowchart illustrating a method for driving a display device according to embodiments.

Referring to FIG. 16, an embodiment of a method for driving a display device may include determining an analog-to-digital conversion time of a power current of a display panel based on a peak white luminance (S100), sensing the power current of the display panel (S200), generating a power current code by performing analog-to-digital conversion on the sensed power current (S300), determining a current limit based on a full white luminance (S400), and decreasing a power voltage of the display panel when a current value corresponding to the power current code exceeds the current limit (S500).

In an embodiment, as shown in FIG. 16, the method for driving the display device may include determining the analog-to-digital conversion time of the power current of the display panel based on the peak white luminance (S100). In an embodiment, the analog-to-digital conversion time may be gradually increased as the peak white luminance decreases. In an embodiment, the analog-to-digital conversion time may be determined by using a conversion time lookup table including the analog-to-digital conversion time corresponding to the peak white luminance.

In an embodiment, as shown in FIG. 16, the method for driving the display device may include determining the current limit based on the full white luminance (S400). In an embodiment, the current limit may be gradually decreased as the full white luminance decreases. In an embodiment, the current limit may be determined by using a current limit lookup table including the current limit corresponding to the full white luminance.

Figure 17:
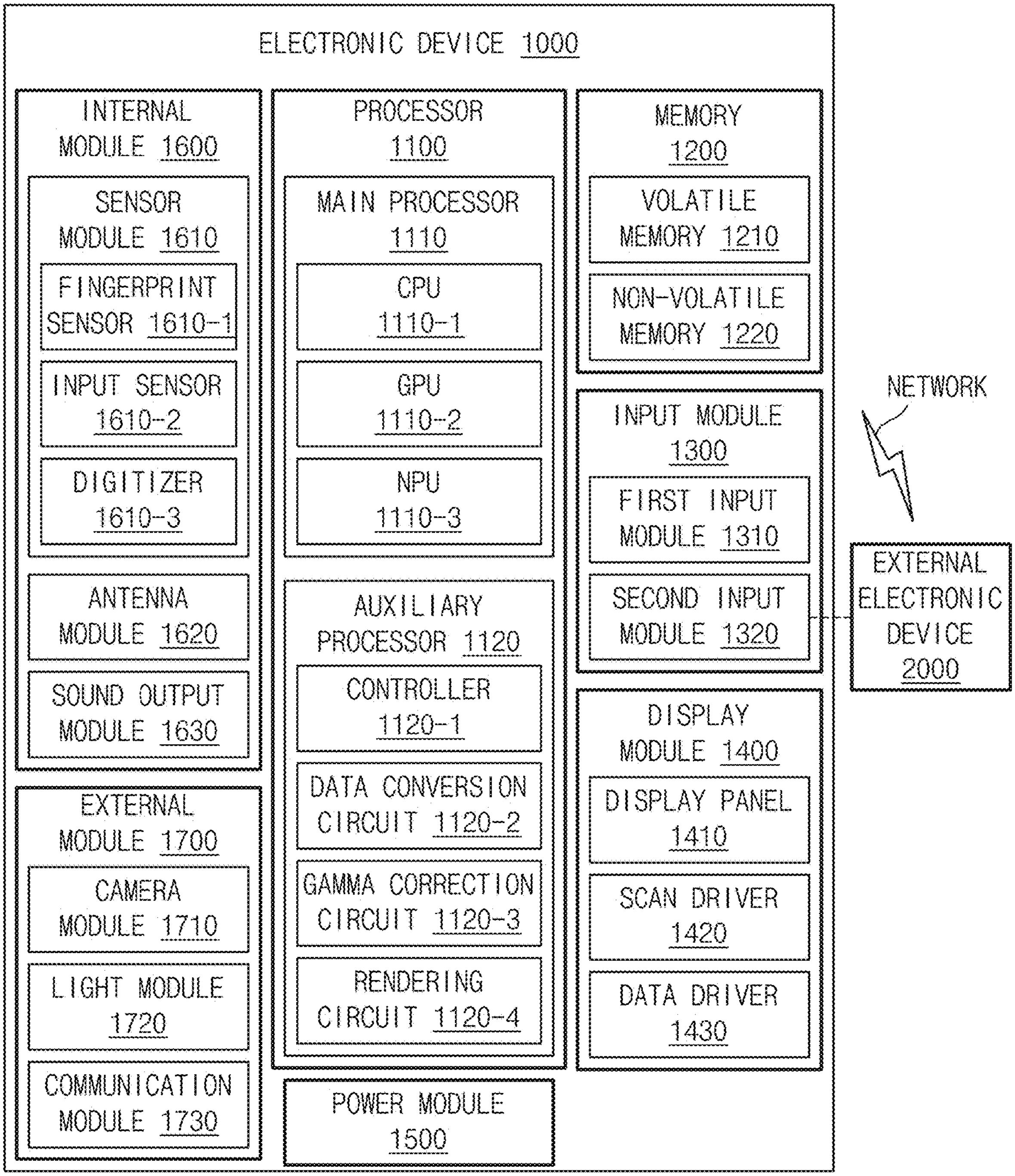
FIG. 17 is a block diagram illustrating an electronic device according to embodiments.
Figure 18:
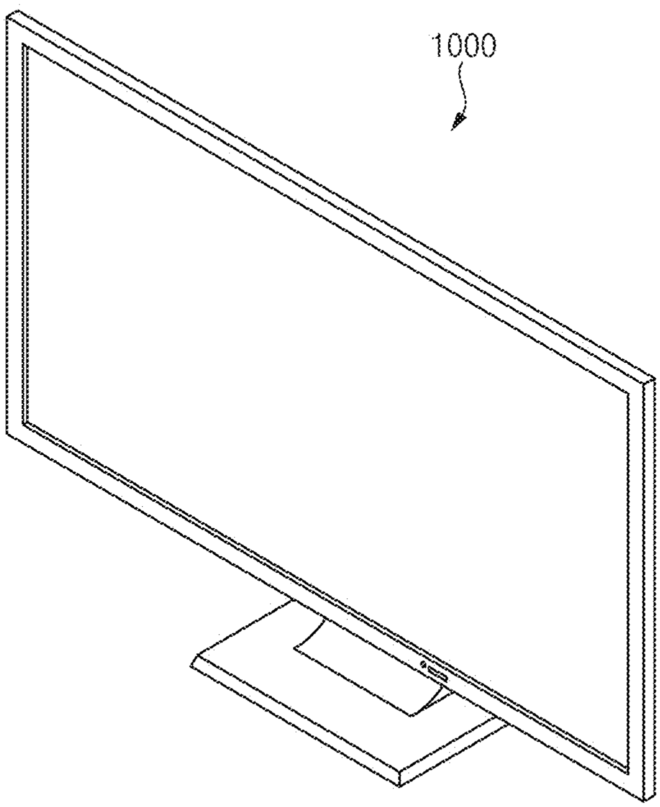
FIG. 18 is a diagram illustrating an embodiment in which the electronic device 1000 of FIG. 17 is implemented as a television.

FIG. 17 is a block diagram illustrating an electronic device 1000 according to embodiments, and FIG. 18 is a diagram illustrating an example in which the electronic device 1000 of FIG. 17 is implemented as a television.

Referring to FIGS. 17 and 18, an embodiment of an electronic device 1000 may output various information through a display module 1400 within an operating system. When a processor 1100 executes an application stored in a memory 1200, the display module 1400 may provide application information to a user through a display panel 1410. Here, the display panel 1410 may be the display panel of FIG. 1.

In an embodiment, as shown in FIG. 18, an electronic device 1000 may be implemented as a television. However, since the above configuration has been provided for illustrative purposes, the electronic device 1000 is not limited thereto. For example, the electronic device 1000 may be implemented as a mobile phone, a video phone, a smart pad, a smart watch, a tablet personal computer (PC), a vehicle navigation, a computer monitor, a laptop computer, a head-mounted display device, or the like.

The processor 1100 may obtain an external input through an input module 1300 or a sensor module 1610, and execute an application corresponding to the external input. In an embodiment, for example, when the user selects a camera icon displayed on the display panel 1410, the processor 1100 may obtain a user input through an input sensor 1610-2, and activate a camera module 1710. The processor 1100 may transmit a data signal corresponding to a captured image obtained through the camera module 1710 to the display module 1400. The display module 1400 may display an image corresponding to the captured image through the display panel 1410.

In an embodiment, for example, when personal information authentication is executed in the display module 1400, a fingerprint sensor 1610-1 may obtain fingerprint information, which is input, as input data. The processor 1100 may compare the input data obtained through the fingerprint sensor 1610-1 with authentication data stored in the memory 1200, and execute an application according to a comparison result. The display module 1400 may display information executed according to logic of the application through the display panel 1410.

In an embodiment, for example, when a music-streaming icon displayed on the display module 1400 is selected, the processor 1100 may obtain the user input through the input sensor 1610-2, and activate a music streaming application stored in the memory 1200. When a music execution command is input in the music streaming application, the processor 1100 may activate a sound output module 1630 to provide sound information corresponding to the music execution command to the user.

An operation of the electronic device 1000 has been briefly described above. Hereinafter, a configuration of the electronic device 1000 will be described in detail. Some of components of the electronic device 1000 that will be described below may be integrated with each other so as to be provided as one component, and one component may be separated into two or more components so as to be provided.

The electronic device 1000 may communicate with an external electronic device 2000 through a network (e.g., a short-range wireless communication network or a long-range wireless communication network). In an embodiment, the electronic device 1000 may include a processor 1100, a memory 1200, an input module 1300, a display module 1400, a power module 1500, an internal module 1600, and an external module 1700. In an embodiment, at least one of the components described above may be omitted from the electronic device 1000, or one or more other components may be added to the electronic device 1000. In an embodiment, some of the components described above (e.g., the sensor module 1610, an antenna module 1620, or the sound output module 1630) may be integrated into another component (e.g., the display module 1400).

The processor 1100 may execute software to control at least one of other components (e.g., hardware or software components) of the electronic device 1000 connected to the processor 1100, and may perform various data processing or calculations. In an embodiment, as at least portion of the data processing or calculations, the processor 1100 may store a command or data received from another component (e.g., the input module 1300, the sensor module 1610, or a communication module 1730) in a volatile memory 1210, process the command or data stored in the volatile memory 1210, and store result data in a non-volatile memory 1220.

The processor 1100 may include a main processor 1110 and an auxiliary processor 1120. The main processor 1110 may include at least one of a central processing unit (CPU) 1110-1 or an application processor (AP). The main processor 1110 may further include at least one of a graphic processing unit (GPU) 1110-2, a communication processor (CP), and an image signal processor (ISP). The main processor 1110 may further include a neural processing unit (NPU) 1110-3. The neural processing unit may be a processor specialized in processing of an artificial intelligence model, and the artificial intelligence model may be generated through machine learning. The artificial intelligence model may include a plurality of artificial neural network layers. An artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of at least two thereof, but is not limited to the examples described above. The artificial intelligence model may additionally or alternatively include a software structure in addition to a hardware structure. At least two of the processing units and processors described above may be implemented as one integrated component (e.g., a single chip), or may be implemented as independent components (e.g., a plurality of chips), respectively.

The auxiliary processor 1120 may include a controller 1120-1. The controller 1120-1 may include an interface conversion circuit and a timing control circuit. The controller 1120-1 may receive input image data from the main processor 1110, and may convert a data format of the input image data to meet interface specifications with the display module 1400 to output a data signal. The controller 1120-1 may output various control signals required for driving the display module 1400.

The auxiliary processor 1120 may further include a data conversion circuit 1120-2, a gamma correction circuit 1120-3, a rendering circuit 1120-4, or the like. The data conversion circuit 1120-2 may receive the data signal from the controller 1120-1, and may compensate for the data signal to display an image with a desired luminance according to characteristics of the electronic device 1000, settings of the user, or the like, or convert the data signal for reduction of power consumption, afterimage compensation, or the like. The gamma correction circuit 1120-3 may convert the data signal, a gamma reference voltage, or the like so that an image displayed on the electronic device 1000 may have a desired gamma characteristic. The rendering circuit 1120-4 may receive the data signal from the controller 1120-1, and may render the data signal in consideration of a pixel arrangement and the like of the display panel 1410 applied to the electronic device 1000. At least one selected from the data conversion circuit 1120-2, the gamma correction circuit 1120-3, and the rendering circuit 1120-4 may be integrated into another component (e.g., the main processor 1110 or the controller 1120-1).

At least one selected from the controller 1120-1, the data conversion circuit 1120-2, the gamma correction circuit 1120-3, and the rendering circuit 1120-4 may be integrated into a data driver 1430 that will be described below.

Here, the auxiliary processor 1120 may correspond to the timing controller in FIG. 1.

The memory 1200 may store various data used by at least one of the components (e.g., the processor 1100 or the sensor module 1610) of the electronic device 1000, and input data or output data for a command associated with the stored various data. The memory 1200 may include at least one selected from the volatile memory 1210 and the non-volatile memory 1220.

The input module 1300 may receive a command or data to be used for the components (e.g., the processor 1100, the sensor module 1610, or the sound output module 1630) of the electronic device 1000 from an outside of the electronic device 1000 (e.g., the user or the external electronic device 2000).

The input module 1300 may include a first input module 1310 configured to receive a command or data from the user and a second input module 1320 for configured to receive a command or data from the external electronic device 2000. The first input module 1310 may include a microphone, a mouse, a keyboard, a key (e.g., a button), or a pen (e.g., a passive pen or an active pen). The second input module 1320 may support a designated protocol capable of enabling wired or wireless connection with the external electronic device 2000. In an embodiment, the second input module 1320 may include a high-definition multimedia interface (HDMI), a universal serial bus (USB) interface, an SD card interface, or an audio interface. The second input module 1320 may include a connector capable of enabling physical connection with the external electronic device 2000, for example, an HDMI connector, a USB connector, an SD card connector, or an audio connector (e.g., a headphone connector).

The display module 1400 may visually provide information to the user. The display module 1400 may include a display panel 1410, a gate driver 1420, and a data driver 1430. The display module 1400 may further include a window, a chassis, and a bracket configured to protect the display panel 1410. Here, the gate driver 1420 and the data driver 1430 may correspond to the gate driver and the data driver in FIG. 1, respectively.

The display panel 1410 may include a liquid crystal display panel, an organic light emitting display panel, or an inorganic light emitting display panel, and a type of display panel 1410 is not particularly limited. The display panel 1410 may be a rigid type or a flexible type that may be rolled or folded. The display module 1400 may further include a supporter, a bracket, a heat dissipation member, or the like configured to support the display panel 1410.

The gate driver 1420 may be mounted on the display panel 1410 as a driving chip. In addition, the gate driver 1420 may be integrated on the display panel 1410. For example, the gate driver 1420 may include an amorphous silicon thin film transistor (TFT) gate driver circuit (ASG), a low-temperature polycrystalline silicon (LTPS) TFT gate driver circuit, or an oxide semiconductor TFT gate driver circuit (OSG), which is embedded in the display panel 1410. The gate driver 1420 may receive a control signal from the controller 1120-1, and output gate signals to the display panel 1410 in response to the control signal.

The display panel 1410 may further include an emission driver. The emission driver may output an emission signal to the display panel 1410 in response to the control signal received from the controller 1120-1. The emission driver may be formed separately from the gate driver 1420, or may be integrated into the gate driver 1420.

The data driver 1430 may receive the control signal from the controller 1120-1, convert the data signal into an analog voltage (e.g., a data voltage) in response to the control signal, and output data voltages to the display panel 1410.

The data driver 1430 may be integrated into another component (e.g., the controller 1120-1). The functions of the interface conversion circuit and the timing control circuit of the controller 1120-1 described above may be integrated into the data driver 1430.

The display module 1400 may further include a light emission driver, a voltage generation circuit, or the like. The voltage generation circuit may output various voltages required for driving the display panel 1410.

The display module 1400 may further include a power current sensor configured to sense a power current of the display panel 1410, and generate a power current code by performing analog-to-digital conversion on the sensed power current. The controller 1120-1 may determine an analog-to-digital conversion time of the power current based on a peak white luminance. Therefore, the analog-to-digital conversion time may be adjusted based on the peak white luminance, so that an increase in power consumption caused by an over current may be minimized, and accuracy of analog-to-digital conversion may be improved.

The power module 1500 may supply a power to the components of the electronic device 1000. The power module 1500 may include a battery configured to charge a power voltage. The battery may include a primary battery that is non-rechargeable, and a secondary battery or a fuel battery, which is rechargeable. The power module 1500 may include a power management integrated circuit (PMIC). The PMIC may supply an optimized power to each of the modules described above and modules that will be described below. The power module 1500 may include a wireless power transmission/reception member electrically connected to the battery. The wireless power transmission/reception member may include a plurality of antenna radiators having a coil shape.

The electronic device 1000 may further include an internal module 1600 and an external module 1700. The internal module 1600 may include a sensor module 1610, an antenna module 1620, and a sound output module 1630. The external module 1700 may include a camera module 1710, a light module 1720, and a communication module 1730.

The sensor module 1610 may sense an input caused by a body of the user or an input caused by the pen among the first input module 1310, and may generate an electrical signal or a data value corresponding to the input. The sensor module 1610 may include at least one of a fingerprint sensor 1610-1, an input sensor 1610-2, and a digitizer 1610-3.

The fingerprint sensor 1610-1 may generate a data value corresponding to a fingerprint of the user. The fingerprint sensor 1610-1 may include one of optical or capacitive fingerprint sensors.

The input sensor 1610-2 may generate a data value corresponding to coordinate information of the input caused by the body of the user or the input caused by the pen. The input sensor 1610-2 may generate a capacitance variation caused by the input as the data value. The input sensor 1610-2 may sense an input caused by the passive pen, or may transmit/receive data to/from the active pen.

The input sensor 1610-2 may measure a bio signal such as a blood pressure, moisture, or body fat. In an embodiment, for example, when the user does not move for a predetermined time while allowing a portion of the body to make contact with a sensor layer or a sensing panel, the input sensor 1610-2 may sense the bio signal to output information desired by the user to the display module 1400 based on an electric field variation caused by the portion of the body.

The digitizer 1610-3 may generate a data value corresponding to coordinate information of the input caused by the pen. The digitizer 1610-3 may generate an electromagnetic variation caused by the input as the data value. The digitizer 1610-3 may sense the input caused by the passive pen, or may transmit/receive data to/from the active pen.

At least one selected from the fingerprint sensor 1610-1, the input sensor 1610-2, and the digitizer 1610-3 may be implemented as a sensor layer formed on the display panel 1410 through consecutive processes. The fingerprint sensor 1610-1, the input sensor 1610-2, and the digitizer 1610-3 may be disposed on the display panel 1410, and one of the fingerprint sensor 1610-1, the input sensor 1610-2, and the digitizer 1610-3, for example, the digitizer 1610-3 may be disposed under the display panel 1410.

At least two selected from the fingerprint sensor 1610-1, the input sensor 1610-2, and the digitizer 1610-3 may be integrated into one sensing panel through the same process. In an embodiment where at least two selected from the fingerprint sensor 1610-1, the input sensor 1610-2 and the digitizer 1610-3 are integrated into one sensing panel, the sensing panel may be disposed between the display panel 1410 and the window disposed on the display panel 1410. In an embodiment, the sensing panel may be disposed on the window, and a location of the sensing panel is not particularly limited.

At least one selected from the fingerprint sensor 1610-1, the input sensor 1610-2, and the digitizer 1610-3 may be embedded in the display panel 1410. In such an embodiment, at least one selected from the fingerprint sensor 1610-1, the input sensor 1610-2, and the digitizer 1610-3 may be simultaneously formed through a process of forming elements included in the display panel 1410 (e.g., a light emitting element, a transistor, etc.).

In an embodiment, the sensor module 1610 may generate an electrical signal or a data value corresponding to an internal state or an external state of the electronic device 1000. The sensor module 1610 may further include, for example, a gesture sensor, a gyro sensor, an atmospheric pressure sensor, a magnetic sensor, an acceleration sensor, a grip sensor, a proximity sensor, a color sensor, an infrared (IR) sensor, a biosensor, a temperature sensor, a humidity sensor, or an illuminance sensor.

The antenna module 1620 may include at least one antenna configured to transmit a signal or a power to the outside or receive the signal or the power from the outside. In an embodiment, the communication module 1730 may transmit the signal to the external electronic device or receive the signal from the external electronic device through an antenna suitable for a communication scheme. An antenna pattern of the antenna module 1620 may be integrated into one of the components of the display module 1400 (e.g., the display panel 1410), the input sensor 1610-2, or the like.

The sound output module 1630 may be a device configured to output a sound signal to the outside of the electronic device 1000, and may include, for example, a speaker used for general purposes such as multimedia playback or recording playback, and a receiver used exclusively for receiving a phone call. In an embodiment, the receiver may be formed integrally with or separately from the speaker. A sound output pattern of the sound output module 1630 may be integrated into the display module 1400.

The camera module 1710 may capture a still image and a moving image. In an embodiment, the camera module 1710 may include at least one lens, image sensor, or image signal processor. The camera module 1710 may further include an infrared camera capable of measuring presence or absence of the user, a location of the user, a line of sight of the user, and the like.

The light module 1720 may provide a light. The light module 1720 may include a light emitting diode or a xenon lamp. The light module 1720 may operate in conjunction with the camera module 1710, or may operate independently.

The communication module 1730 may support establishing a wired or wireless communication channel between the electronic device 1000 and the external electronic device 2000, and may support performing communication through the established communication channel. The communication module 1730 may include one or both of a wireless communication module such as a cellular communication module, a short-range wireless communication module, or a global navigation satellite system (GNSS) communication module and a wired communication module such as a local area network (LAN) communication module or a power line communication module. The communication module 1730 may communicate with the external electronic device 2000 through a short-range communication network such as Bluetooth, Wi-Fi direct, or infrared data association (IrDA) or a long-range communication network such as a cellular network, the Internet, or a computer network (e.g., LAN or WAN). Various types of the communication modules 1730 described above may be implemented as a single chip, or may be implemented as separate chips, respectively.

The input module 1300, the sensor module 1610, the camera module 1710, and the like may be used to control an operation of the display module 1400 in conjunction with the processor 1100.

The processor 1100 may output the command or data to the display module 1400, the sound output module 1630, the camera module 1710, or the light module 1720 based on the input data received from the input module 1300. In an embodiment, for example, the processor 1100 may generate a data signal corresponding to the input data applied through the mouse, the active pen, or the like to output the generated data signal to the display module 1400, or may generate command data corresponding to the input data to output the generated command data to the camera module 1710 or the light module 1720. The processor 1100 may switch an operation mode of the electronic device 1000 to a low-power mode or a sleep mode so as to reduce a power consumed by the electronic device 1000 when the input data is not received from the input module 1300 for a predetermined time.

The processor 1100 may output the command or data to the display module 1400, the sound output module 1630, the camera module 1710, or the light module 1720 based on sensing data received from the sensor module 1610. In an embodiment, for example, the processor 1100 may compare authentication data applied by the fingerprint sensor 1610-1 with authentication data stored in the memory 1200, and execute an application according to a comparison result. The processor 1100 may execute a command or output a corresponding data signal to the display module 1400 based on the sensing data sensed by the input sensor 1610-2 or the digitizer 1610-3. When the sensor module 1610 includes a temperature sensor, the processor 1100 may receive temperature data on a temperature measured by the sensor module 1610, and may further perform luminance correction and the like on the data signal based on the temperature data.

The processor 1100 may receive measurement data on the presence or absence of the user, the location of the user, the line of sight of the user, and the like from the camera module 1710. The processor 1100 may further perform the luminance correction and the like on the data signal based on the measurement data. In an embodiment, for example, the processor 1100 that has determined the presence or absence of the user through an input from the camera module 1710 may output a data signal in which a luminance is corrected through the data conversion circuit 1120-2 or the gamma correction circuit 1120-3 to the display module 1400.

Some of the components described above may be connected to each other through a communication scheme between peripheral devices, for example, a bus, general purpose input/output (GPIO), a serial peripheral interface (SPI), a mobile industry processor interface (MIPI), or an ultra path interconnect (UPI) link to exchange a signal (e.g., the command or data) with each other. The processor 1100 may communicate with the display module 1400 through a prescribed interface, may use, for example, one of the communication schemes described above, and is not limited to the communication schemes described above.

The disclosure may be applied to a display device and an electronic device including the display device, for example, a digital television, a three-dimensional (3D) television, a smart phone, a cellular phone, a PC, a tablet PC, a virtual reality (VR) device, a home appliance, a laptop, a personal digital assistant (PDA), a portable media player (PMP), a digital camera, a music player, a portable game console, a car navigation system, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels;

a power voltage generator which provides a power voltage to the display panel;

a power current sensor which senses a power current of the display panel and generates a power current code by performing analog-to-digital conversion on the sensed power current; and a timing controller which determines an analog-to-digital conversion time of the power current based on a peak white luminance, wherein the analog-to-digital conversion time is gradually decreased as the peak white luminance increases, and wherein the peak white luminance is a maximum luminance of the display panel.

2. The display device of claim 1, wherein the timing controller determines the peak white luminance based on a preset peak setting value and a preset gain setting value.

3. The display device of claim 2, wherein the peak white luminance is gradually decreased as the peak setting value decreases.

4. The display device of claim 2, wherein the peak white luminance is gradually decreased as the gain setting value decreases.

5. The display device of claim 1, wherein the timing controller determines the analog-to-digital conversion time by using a conversion time lookup table including the analog-to-digital conversion time corresponding to the peak white luminance.

6. The display device of claim 1, wherein the timing controller decreases the power voltage when a current value corresponding to the power current code exceeds a current limit.

7. The display device of claim 6, wherein the timing controller determines the current limit based on a full white luminance.

8. The display device of claim 7, wherein the full white luminance is a luminance when the display panel displays a full white image.

9. The display device of claim 7, wherein the current limit is gradually decreased as the full white luminance decreases.

10. The display device of claim 7, wherein the timing controller determines the full white luminance based on a preset gain setting value.

11. The display device of claim 10, wherein the full white luminance is gradually decreased as the gain setting value decreases.

12. The display device of claim 7, wherein the timing controller determines the current limit by using a current limit lookup table including the current limit corresponding to the full white luminance.

13. An electronic device comprising the display device of claim 1.

14. A display device comprising:

a display panel including pixels;

a power voltage generator which provides a power voltage to the display panel;

a power current sensor which senses a power current of the display panel and generates a power current code by performing analog-to-digital conversion on the sensed power current; and a timing controller which decreases the power voltage when a current value corresponding to the power current code exceeds a current limit and determines the current limit based on a full white luminance, wherein the current limit is gradually decreased as the full white luminance decreases by using a current limit lookup table including the current limit corresponding to the full white luminance, wherein the full white luminance is a luminance when the display panel displays a full white image, wherein a peak white luminance is a maximum luminance of the display panel, and wherein the full white luminance is different from the peak white luminance.

15. The display device of claim 14, wherein the timing controller determines the full white luminance based on a preset gain setting value.

16. The display device of claim 14, wherein the timing controller determines the current limit by using a current limit lookup table including the current limit corresponding to the full white luminance.

17. An electronic device comprising the display device of claim 14.

18. A method for driving a display device, the method comprising:

determining an analog-to-digital conversion time of a power current of a display panel based on a peak white luminance;

sensing the power current of the display panel; and generating a power current code by performing analog-to-digital conversion on the sensed power current, wherein the analog-to-digital conversion time is gradually decreased as the peak white luminance increases, and wherein the peak white luminance is a maximum luminance of the display panel.

19. The method of claim 18, further comprising:

determining a current limit based on a full white luminance; and decreasing a power voltage of the display panel when a current value corresponding to the power current code exceeds the current limit.

20. The method of claim 18, wherein the peak white luminance is determined based on a preset peak setting value and a preset gain setting value.

21. The method of claim 18, wherein the analog-to-digital conversion time is determined by using a conversion time lookup table including the analog-to-digital conversion time corresponding to the peak white luminance.

* * * * *